United States Patent [19]

Mehra et al.

[11] Patent Number: 5,700,412

[45] Date of Patent: *Dec. 23, 1997

[54] PROCESS FOR MAKING LAMINAR ARTICLES

[75] Inventors: Vinodkumar Mehra, Wilmington, Del.; Robert Benham Fish, Jr., Parkersburg, W. Va.

[73] Assignee: E. I. du Pont de Nemours and Company, Wilmington, Del.

[*] Notice: The term of this patent shall not extend beyond the expiration date of Pat. No. 5,399,619.

[21] Appl. No.: 587,693

[22] Filed: Jan. 17, 1996

Related U.S. Application Data

[60] Continuation-in-part of Ser. No. 277,814, Jul. 20, 1994, abandoned, which is a division of Ser. No. 143,764, Nov. 1, 1993, abandoned.

[51] Int. Cl.$^6$ .............................. B29B 9/06; B29C 47/06
[52] U.S. Cl. .................. 264/143; 264/514; 264/172.15; 264/173.14; 264/173.15; 264/173.19
[58] Field of Search .................... 264/143, 141, 264/173.19, 173.14, 173.15, 172.15, 514, 515

[56] References Cited

U.S. PATENT DOCUMENTS

| | | | |
|---|---|---|---|
| 3,726,955 | 4/1973 | Hughes et al. | 264/172.15 |
| 4,376,084 | 3/1983 | Cowen et al. | 264/172.15 |
| 4,647,509 | 3/1987 | Wallace et al. | 156/244.11 |
| 4,731,216 | 3/1988 | Topolski | 264/515 |
| 4,803,035 | 2/1989 | Kresge et al. | 264/143 |
| 4,950,513 | 8/1990 | Mehra | 264/173.19 |
| 4,971,864 | 11/1990 | McCord | 428/516 |
| 5,024,897 | 6/1991 | Mason et al. | 428/474.4 |
| 5,188,784 | 2/1993 | Kamal et al. | 264/173.19 |
| 5,330,696 | 7/1994 | Mehra | 264/141 |
| 5,399,619 | 3/1995 | Torradas et al. | 525/57 |

FOREIGN PATENT DOCUMENTS

| | | | |
|---|---|---|---|
| 0494473 | 7/1992 | European Pat. Off. | 264/172.15 |
| 55-166216 | 12/1980 | Japan | 264/143 |
| 59-81120 | 5/1984 | Japan | 264/143 |

*Primary Examiner*—Jeffery R. Thurlow

[57] ABSTRACT

This invention relates to a process for making laminar articles by blending multicomponent pellets of a heterogeneous blend of a barrier resin, typically a condensation polymer, and a compatibilizer with a polyolefin. The pellets advantageously prevent segregation of the barrier resin and the compatibilizer during processing. This provides uniform, reproducible laminar articles with improved barrier properties and mechanical properties. The articles exhibit good fluid barrier and mechanical properties.

2 Claims, No Drawings

PROCESS FOR MAKING LAMINAR ARTICLES

CROSS REFERENCE TO RELATED APPLICATIONS

This is a continuation in part of U.S. Ser. No. 08/277,814 filed Jul. 20, 1994, now abandoned which is, in turn, a division of U.S. Ser. No. 08/143,764, filed Nov. 1, 1993, now abandoned.

BACKGROUND OF THE INVENTION

1. Technical Field

This invention relates to a process for the manufacture of laminar, shaped articles of a heterogeneous blend of a polyolefin and a barrier resin, a condensation polymer incompatible with the polyolefin, and a compatibilizer. More specifically, it uses a pellet having substantially heterogeneous regions of barrier resin and compatibilizer, such as a coated pellet of condensation polymer and compatibilizer, to improve the handling, shipping and use of the condensation polymer and the compatibilizer.

2. Background Art

U.S. Pat. No. 4,410,482 discloses a process for manufacturing a laminar, shaped article of polymeric material, typically in pellet form, comprising the steps of establishing a melted, heterogeneous, blend of a polyolefin, a condensation polymer such as a polyamide, and a compatibilizer; and forming the melted blend by stretching a body of the melt and cooling the stretched body to below the melting point of the lowest melting polymer component. U.S. Pat. No. 4,410,482 also discloses laminar shaped articles based on such blend wherein the polyolefin and the polyamide are present in the article as a multitude of thin, substantially two-dimensional, parallel and overlapping layers of material. U.S. Pat. Nos. 4,416,942 and 4,971,864 also disclose laminar shaped articles based on a polyolefin matrix, barrier resins and compatibilizer.

The compatibilizer enables the polyolefin and the barrier resin to be blended to form an integral structure without significant delaminations, voids or structural defects which may adversely affect the physical properties and barrier properties of the final article.

When the polymeric materials used to make the article are provided in pellet form, the properties of the article are often not uniform. In particular, the so-called salt and pepper blend of polymeric pellets are often mixed together during shipment or storage and it is believed that the pellets, particularly the barrier resin and the compatibilizer, segregate. As a result, when the pellets are processed to form the shaped article, the composition of the article may not be uniform and/or reproducible. Consequently, the mechanical properties and barrier properties of a single article and/or different articles from the same batch may not be uniform.

There is, therefore, needed a process for making a laminar shaped article which has uniform, reproducible properties.

SUMMARY OF THE INVENTION

According to this invention there is provided a process for making a laminar, shaped article having improved fluid barrier and mechanical properties, that article comprising (i) polyolefin in the form of a continuous, matrix phase and (ii) a barrier polymer, incompatible with polyolefin (i), in the form of a discontinuous distribution of thin, substantially two-dimensional, parallel and overlapping layers within said polyolefin matrix; said process comprising the steps of:

(a) producing coextruded heterogeneous pellets by melting in a first extruder a barrier polymer; and melting in a second extruder a compatibilizer for said polyolefin and said barrier polymer; thereby producing two melt streams; combining said melt streams in a spin head to produce a coextruded strand; and cutting said strand into pellets;

(b) heterogeneously blending particles of polyolefin and said pellets; and heating the resultant blend to a temperature above the melting point of the highest melting component to form a heterogeneous melt;

(c) stretching the resultant heterogeneous melt 100–500 percent in at least one direction to form a stretched body; and (d) cooling the resultant stretched body to a temperature below the melting point of the lowest melting component.

By "heterogeneous" or "substanttially heterogeneous," it is meant that at least a portion of the pellet must have independent regions of barrier resin and compatiblizer. The regions may be in any configuration, such as one or more layers of each component or so-called "islands" of one component, within a matrix of the other, or combinations of such configurations.

DESCRIPTION OF THE INVENTION

Films, filaments, sheets, containers, tubing, and other shaped articles have long been made from polymeric compositions. Special qualities desired for shaped articles have required special polymers or specially formulated polymeric compositions. This invention utilizes a special process and a polymer pellet to yield an article which exhibits uniform, reproducible and improved barrier to fluid permeation and mechanical properties.

The general product made by this invention is a laminar shaped article made from a mixture of a polyolefin, and a pellet of a barrier resin and a compatibilizer. The product is preferably made by mixing together particles of polyolefin and heterogeneous pellets, heating the mixture to yield a heterogeneous melt of material, and stretching the melt to yield an elongated discontinuous polymer phase. The product is a heterogeneous melt-blended composition. By heterogeneous it is meant that there are regions, domains, particles or platelets, these words being used interchangably, of barrier material, such as polyamide in a matrix of polyolefin.

For purposes of this description, the terms pellet and particle are synonymous. The pellet of the invention is a substantially heterogeneous composition of barrier resin and compatibilizer. Other materials may also be incorporated into the pellet. In one embodiment, the pellet has at least one layer of barrier resin and one layer of compatibilizer. The compatibilizer is preferably on the outermost layer. The coated pellet may have multiple layers, for example, alternating layers of barrier resin and compatibilizer. Layers of the other materials may also be used. In another embodiment, the pellet has "islands" of one component within a matrix of the other. For example, the pellet may have domains of barrier resin within the matrix of compatibilizer or compatibilizer within a matrix of barrier resin. The shape and configuration of such domains are not critical; however, pellets having greater surface area between the compatibilizer and the barrier resin are preferred.

In the case of a two-layer pellet, the outer layer is generally referred to as the sheath and the inner layer is generally referred to as the core. It is preferred that the compatibilizer is the sheath layer and the barrier resin is the core. It is believed that the proximity of the compatibilizer to the barrier resin during processing; i.e., in the form of the coated pellet, advantageously enables the compatibilizer to be in close proximity to the regions, domains, platelets or thin discontinuous layers of barrier resin in the final article. As such, the interpolymer and/or interfacial bonding between the barrier resin and the polyolefin are enhanced. The final laminar shaped article has a uniform distribution of barrier resin and compatibilizer and the article is substantially free of any delaminations, voids or structural defects which may adversely effect the mechanical or barrier properties.

The coated pellet may be made by methods well known in the art, such as coextension and cladding. In one embodiment, the coated pellet may be made by an extrusion process in which dry particles of the barrier resin are fed to an extruder maintained at a temperature above the melting point of the barrier resin. At the same time, the compatibilizer is fed to another extruder maintained at a temperature above the melting point of the compatibilizer, which is typically lower than that of the barrier resin. The barrier resin and the compatibilizer are passed through a metering pump to a spin head where the two streams are combined to produce a coextruded strand. The stand is passed to a pull roll which adjusts the strand diameter. Thereafter, the strand is cooled, such as by passing it through a water bath, and cut into pellets. The size, configuration of composition of the pellets may be readily adjusted.

The polyolefins used in making the laminar articles include polyethylene, polypropylene, polybutylene, copolymers of those materials, and the like. Polyethylene is preferred and may be high, medium or low density.

The barrier resin may be any barrier resin known in the art, including without limitation, condensation polymers, vinyl alcohol polymers and polymers including copolymers or terpolymers of vinyl alcohol and ethylene, which is incompatible with the polyolefin. For the purposes of this invention, "incompatible polymers" means polymeric materials which have substantially no mutual miscibility in the melt form. The condensation polymer, incompatible with the polyolefin, includes without limitaton polyamides, polyethylene terephthalate and polycarbonates. Other polymers such as ethylene vinyl alcohol copolymers are also useful as a barrier resin which is incompatible with the polyolefin.

Polyamides and copolyamides are well known and are made by reacting carboxylic acids with primary amines under well-known conditions. Examples of carboxylic acids used in carboxylic acids used in polyamide preparation are adipic acid, suberic acid, sebacic acid, azelaic acid, malonic acid, glutaric acid, pimelic acid, and the like. Examples of primary amines are tetramethylene diamine, pentamethylene diamine, hexamethylene diamine, octamethylene diamine, and the like. Exemplary polyamides include polypentamethylene adipamide, polyhexamethylene adipamide, polyhexamethylene sebacamide, polyamides obtained from lactams such as caprolactams and from amino acids such as 11-aminoudecanoic acid, and the like. Polyhexamethylene adipamide and polycaproamide are preferred.

The polyamides and copolyamides may be melt blended with other components or polymers such as a phenol-formaldehyde resin.

As noted above, the barrier resin may also be an ethylene-vinyl alcohol copolymer or terpolymer. Ethylene-vinyl alcohol copolymers generally contain about 20 to about 60 mole % of ethylene, which copolymer is further characterized by having a melting point at least about 5° C. greater than the polyolefin. Copolymers of ethylene and vinyl alcohol suitable for use in the present invention can be prepared by the methods disclosed in U.S. Pat. Nos. 3,510,464; 3,560,461; 3,847,845; and 3,585,177.

As is well known to those skilled in the art, the required ethylene-vinyl alcohol copolymers are prepared by saponification of ethylene-vinyl acetate copolymers. For use in the present invention, the degree of saponification should be greater than about 95% and preferably at least 99%. Typically these copolymers have number average molecular weights of about 20,000 to 80,000, but their molecular weight is not directly critical to this invention. It may be possible to blend an ethylene-vinyl alcohol copolymer saponified product with other rubbery polymer as described in U.S. Pat. No. No. 3,975,463. For example, an ethylene-propylene copolymer, a polyisobutylene, a chlorosulfonated polyethylene, a polyisoprene, a polysulfurized rubber, a polychloroprene or a styrene-butadiene copolymer may be blended. The ethylene vinyl alcohol copolymer may also be blended with other components or polymers such as phenol-formaldehyde resins.

The barrier resin may be blended with other components such as fillers or additives, or compatibilizers. For barrier resin which incorporate one or more compatibilizers, a majority of the barrier resin and compatibilizer components should be barrier resin.

The compatibilizer may be any number of compatibilizers which are known in the art. By compatibilizer it is meant that the polyolefin and the polyamide barrier resin may be blended to form an integral structure without significant delaminations, voids, or other structural defects which may adversely affect the physical properties and barrier properties. The compatibilizer is believed to promote interpolymer or interfacial bonding between the polyolefin and the polyamide barrier resin. In absence of the compatibilizer, the polymer layers making up the laminar article do not adhere to one another and the article may not have useful mechanical properties.

The preferred compatibilizer is an alkyl-carboxyl substituted polyolefin, which is described in U.S. Pat. No. 4,950,513. The alkylcarboxyl-substitued polyolefin compatibilizer is a polyolefin which has carboxylic moieties attached thereto, either on the polyolefin backbone itself or on side chains. By "carboxylic moiety" is meant acids, esters, anhydrides, and salts. Carboxylic salts are neutralized carboxylic acids and a compatibilizer which includes carboxylic salts as a carboxylic moiety also includes the carboxylic acid of that salt. Such compatibilizers are termed ionomeric polymers.

Such compatibilizers can be prepared by direct synthesis or by grafting. An example of direct synthesis is the polymerization of an α-olefin with an olefinic monomer having a carboxylic moiety; and an example of grafting is the addition of a monomer having a carboxylic moiety to a polyolefin backbone. In the comptibilizer made by grafting, the polyolefin is polyethylene or a copolymer of ethylene and at least one α-olefin of 3–8 carbon atoms such as propylene, and the like, or a copolymer including at least one α-olefin of 3–8 carbon atoms and a diolefin, such as 1,4-hexadiene, and the like. The polymer may also be a terpolymer. The polyolefin is reacted with an unsaturated carboxylic acid, anhydride, or ester monomer to obtain the grafter polymer. Representative eligible acids, anhydrides, and esters include: methacrylic acid; acrylic acid ethacrylic acid; glycidyl methacrylate; 2-hydroxyethylacrylate; 2-hydroxy ethyl methacrylate; diethyl maeleate; monoethyl maleate; di-n-butyl maleate; maleic anhydride; maleic acid; fumaric acid; itaconic acid; monoesters of such dicarboxylic acids; dodecenyl succinic anhydride; 5-norbornene-2,3-anhydride; nadic anhydride (3,6-endomethylene-1,2,3,5-tetrahydrophthalic anhydride); and the like. Generally, the graft polymer will have from about 0.01 to about 20, preferably about 0.1 to about 10, and most perferably about 0.2 to about 5, weight percent graft monomer. Grafted polymers are described in greater detail in U.S. Pat. Nos. 4,026,967 and 3,953,655.

In the compatibilizer made by direct synthesis, the polymeric material is a copolymer of an α-olefin of 2–10 carbon atoms and an α,β-ethylenically unsaturated carboxylic acid, ester, anhydride, or salt having 1 or 2 carboxylic moieties. The directly synthesized compatibilizer is made up of at least 75 mole percent of the olefin component and from about 0.2 to 25 mole percent of the carboxylic component.

Ionomeric compatibilizers are preferably made from directly synthesized compatibilizer and is preferably made up of about 90 to 99 mole percent olefin and about 1 to 10 mole percent α,β-ethylenically unsaturated monomer having carboxylic moieties wherein the moieties are considered as acid equivalents and are neutralized with metal ions having valences of 1 to 3, inclusive, where the carboxylic acid equivalent is monocarboxylic and are neutralized with metal ions having a valence of 1 where the carboxylic acid equivalent is dicarboxylic. To control the degree of neutralization, metal ions are present in an amount sufficient to neutralize at least 10 percent of the carboxyl moieties. Representative eligible α-olefins and unsaturated carboxylic acid, anhydride, and ester monomers are those previously herein described. Ionomeric polymers are described in greater detail in U.S. Pat. No. 3,264,272.

The alkyl-carboxyl substituted polyolefin compatibilizer preferably is a copolymer of ethylene and an α,β-ethylenically unsaturated carboxylic acid.

Illustrative of the α,β-ethylenically unsaturated carboxylic acids useful in the preparation of said copolymer are acrylic acid, methacrylic acid, ethacrylic acid, itaconic acid, maleic acid, fumaric acid, and monoesters of itaconic acid, maleic acid, and fumaric acid. To the extent that a metallic ion is used to neutralize the acid groups of the carboxylic acid it is preferred that the metal be zinc, although useful results can be obtained using other metal cations such as sodium, potassium, lithium, magnesium, aluminum, and strontium in place of zinc. Procedures for preparing these copolymers are described in U.S. Pat. No. 3,264,272. An especially useful composition is an ionomer made up of metal ion partially neutralized ethylenemethacrylic acid copolymers.

As noted above, the compatibilizer, may also be a graft polymer with a polyolefin backbone onto which cyclic anhydride moieties, derived from maleic anhydride, for example have been grafted.

These compatibilizers are described in U.S. Pat. No. 4,971,864 and can be prepared by procedures such as those described in U.S. Pat. Nos. 4,026,967 and 4,612,155. While numerous compounds can be used as graft monomers, maleic anhydride is preferred. Less preferred graft monomers include mono-esters of maleic acid, maleic acid and fumaric acid, which monomers are believed to be largely converted to cyclic anhydride moieties at the high temperatures encounted during the grafting reaction. Also suitable are other cyclic anhydrides containing carbon-carbon unsaturation such as dodeceny, succinic anhydride, 5-norbornene-2,3-anhydride, and 3,6-endomothylene-1,2,3,6-tetrahydrophthalic anhydride.

The compatibilizer may be blended with additives or fillers, including barrier resins. For compatibilizers which incorporate one or more barrier resins, a majority of the compatibilizer and barrier resin components should be compatibilizer.

The process for making laminar articles comprises the steps of establishing a melted heterogeneous blend of a polyolefin, and a coated pellet of the barrier resin and a compatibilizer; and forming the melted blend by stretching a body of the melt and cooling the stretched body to below the melting point of the lowest melting polymer component.

In one embodiment, the multicomponent particles of barrier resin and compatibilizer, in melted form, are mixed thoroughly so as to provide a substantially homogeneous distribution, and care must be exercised to avoid substantial additional mixing after the polymers have been heated to a melt. In another embodiment, the polymer particles can be combined in softened or molten form so long as the combination of polymers maintains a substantially heterogeneous character. The blend can also be established by combining the polymers at a temperature such that one of the polyolefin or the condensation polymer is not softened or molten and then heating the combination. The success of the invention generally depends on establishing a melted heterogeneous blend of incompatible polymers so that when the melt is stretched, such as by extrusion forces, one polymer is in the form of a continuous matrix phase and another polymer is in the form of a discontinuous, multitude of thin, substantially two-dimensional, parallel and overlapping layers embedded in the continuous phase.

The compatibilizer is the polymer which adheres together adjacent layers or domains of the incompatible polymers. In view of its believed purpose, that polymer can be termed a compatibilizer; but the actual mechanism of its operation is not completely understood. It is believed that at least some of the compatibilizer is concentrated in the laminar, shaped article of this invention between the adjacent layers of incompatible polymer joined partially with one layer and partially with an adjacent layer, thus adhering the layers together. Without the compatibilizer, shaped articles formed from heterogeneous melts of incompatible polymer have poor mechanical properties and generally cannot even be extruded or molded to yield unitary articles. It is known, however, that when the barrier resin and the compatibilizer are heterogeneously blended in a pellet in accordance with the present invention, the laminar shaped articles have improved reproducibility and barrier properties.

It is desired that both the polyolefin and the multicomponent pellet of barrier resin and compatibilizer should be mixed as pellets or particles. The particles should, as a general rule, be of a size such that the molten blend of incompatible polymers when introduced to some melt stretching means, such as extrusion die lips, exhibits the heterogeneity necessary for practice of the invention. When the particles are too small a size, the melted blend, even though not excessively mixed, tends to function as a homogeneous composition because the domains of material making up the discontinuous polymer phase are so small. When the particles, especially the heterogeneous particles of barrier resin and compatibilizer are of too large a size, the melted blend may form into shaped articles having a marbleized structure rather than a laminar structure; the large domains of the materials which would make up the discontinuous phase extending to opposite boundaries of the shaped articles and causing disruption of the material which would make up the continuous phase. The particles are preferably generally regular in shape, such as cubical or spherical or the like. The particles may, however, be irregular; and they may have one dimension substantially greater than another dimension such as would be the case, for example, when flakes of material are used.

When the polyolefin and the coated particles of barrier resin and compatibilizer are present as individual particles, the particles are preferably of approximately the same size although such is not required.

The thickness of the layers of material in the discontinuous phase of the article is a function of the particle size combined with the degree of stretching in the forming step. The particle size of the coated particles is generally selected with a view toward resulting, after stretching, in overlapping layers of barrier resin which can be from about 0.5 to 50 micrometers thick and perhaps, sometimes slightly thicker.

Mixing particles of polymers can be accomplished by any well-known means such as by means of a vee-blender or a tumble mixer or, on a larger scale, by means of a double-cone blender. Continuous mixing of the particles can be accomplished by any of several well-known methods. Of course, the particles can also be mixed by hand, in which case the mixing being that any two samplings of the mixture in a given mass of material should preferably yield substantially the same composition. The mixing of the polymers can be accomplished by adding the coated particles to a melt of the polyolefin maintained at a temperature below the melting point of the barrier resin. In that case, the melt is agitated to obtain an adequate mixture; and the mixture is, thus, ready for the heating step.

Once mixed, the polymers are heated to a temperature greater than the melting point of the highest melting polymer component. It is noted that the heating is conducted for the purpose of stretching the softened or melted blend. In the case of a polymer which exhibits no well-defined melting temperature, "melting temperature" as used here refers to a temperature at least high enough that the polymers have been softened to the degree required to stretch each of the polymers in the blend. That heating results in a softened or melted, heterogeneous blend of materials and the heating must be conducted in a manner which avoids substantial additional mixing of the incompatible polymers because such mixing could cause a homogenization and combination of the melted particles and could result in a melt and a shaped article of homogeneous, unlayered, composition. The heating can be conducted by any of several well-known means and is usually conducted in an extruder. It has been learned that a single-screw extruder of the type which is designed for material transport and not material mixing can be used between the heating and forming steps of this invention without causing homogenization of the two-phase incompatible polymer composition. Low shear and low mixing extruders of the kind normally used for polyvinyl chloride, acrylonitrile, or polyvinylidene chloride can be used to practice this invention if they are used in a way to melt and transport the materials and minimize mixing of the components. High shear and high mixing extruders of the kind normally used for nylon and polyethylene cannot generally be used to practice this invention. To the extent that the composition retains an aspect of heterogeneity, the process and the product of this invention can be realized.

The forming step requires stretching of the melted blend followed by cooling. Stretching is an elongation of the two-phase melt to cause a substantial change in the dimensions of the particles in the discontinuous phase. Stretching can be accomplished by any of several means, or by a combination of more than one such means. For example, the melt can be stretched by being squeezed between rollers or pressed between platens or extruded between die lips. Molding processes such as blow molding also cause stretching in accordance with this process. In the manufacture of containers as shaped articles, the stretching can be accomplished by a combination of extruding a blend of the heterogeneous melt to yield a container preform or parison followed by blow molding the parison into a finished container.

The stretching can be in one direction or in perpendicular directions. Whether the stretching is conducted in one direction or two, there should preferably be an elongation of from 100 to 500 percent in at least one direction; and an elongation of from 100 to 300 percent is more preferred. While the upper limit set out herein is not critical, the lower limit is critical insofar as inadequate stretching does not yield the improved barriers to fluid permeation which characterize this invention. Avoidance of excessive stretching is important only insofar as excessive elongation of the melt may lead to weakening or rupture of the article.

Stretching is followed by cooling to below the temperature of the melting point of the lowest melting component to solidify the shaped article. The cooling can be conducted by any desired means and at any convenient rate. In the case of stretching by blow molding, the mold is often chilled to cool the article; and, in the case of extruding a film, cooling can be accomplished by exposure to cool air or by contact with a quenching roll.

As to the proportions of the components for practicing the invention, the barrier resin which is to be a discontinuous phase in the shaped articles should be present in generally less than about 40 weight percent of the mixture. It has been found that the barrier resin should be present in more than about 2 weight percent and less than about 40 weight percent of the mixture and about 2 to 15 weight percent is preferred. The polyolefin should be present in more than about 60 weight percent and less than about 95 weight percent of the mixture and 70 to 90 weight percent is preferred. The compatibilizer should be present in about 0.25 to 12 weight percent of the mixture and about 2 to 6 weight percent is preferred. Any of the components can be used with or to introduce inert fillers into the composition provided only that the fillers are not of a kind or in an amount which would interfere with formation of the layered construction or with the desired or required properties of the composition. Amounts of opacifiers, colorants, antioxidants, antistatic agents, brighteners, plasticizers, tougheners, flame retardants, reinforcing agents, lubricants, stabilizers and the like which are ordinarily used in structural polymeric materials can be used herein. Preferably such fillers or additives do not adversely affect the physical properties or the heterogeneous nature of the composition in the formed article. The amount of such filler is not included in the calculation of amounts of the polyolefin, barrier resin and compatibilizer. Such fillers or additives may be introduced into either the core or sheath of the coated pellets or both as desired.

EXAMPLES

Comparative Example 1

Particles of nylon and particles of compatibilizer were mixed in a bottle in the ratio of 45.7 weight % nylon and 54.3 weight % compatibilizer. After mixing well, a sample was withdrawn for analysis and was found to contain 49.7 weight % nylon and 50.3 weight % compatibilizer. The contents of the bottle were further mixed for half hour and samples were taken from the top and bottom sections of the bottle and analyzed with the following results:

|  | Weight % Nylon | Weight % Compatibilizer |
|---|---|---|
| Top | 42.6 | 57.4 |
| Bottom | 47.3 | 52.7 |

Thus, there is a considerable variation in the composition of the particle blend.

The nylon used was a copolyamide prepared by condensing hexamethenediamine, adipic acid and caprolactam to give a composition containing about 80 weight percent polyhexamethylene adipamide and 20 weight percent polycaproamide.

The compatibilizer was obtained by melt grafting fumaric acid onto polyethylene having density of 0.957 gm/cubic centimeter and melt index of about 1, as determined according to ASTM-1238. The fumaric acid was grafted onto polyethylene in an amount of about 0.98 weight percent based on total weight polymer in accordance to the teachings of U.S. Pat. No. 4,026,967.

The particles of nylon and particles compatibilizer were then mixed with high density polyethylene in a polyethylene bag and used to make bottles.

The polyethylene used was linear polyethylene having a density of 0.945 gram/cubi centimeter, a melt index of 6 grams/10 minutes as determined by ASTM D-1238 (Condition F).

A mixture of copolyamide 3.2 wt. %, compatibilizer 3.8 wt. % and polyethylene 93 wt. % was fed to Rocheleau model 7A continuous extrusion blow molding machine equipped with a 2:1 compression ratio screw (diam. 38.1 mm) without mixing tip. Bottles with a capacity of approximately 1000 ml were blow molded at an extrusion temperature of about 230° C. The bottles weight approximately 65 grams. The side walls were about 1.25 mm thick and showed laminar distribution of the barrier resin, the copolyamide.

The barrier effectiveness was determined by filling the test containers with xylene and determining the weight loss over a period of several days at 40° C. For each test triplicates were run. The bottles were weighed periodically and their weight loss plotted against time and average steady state weight loss was determined for each run. Based on known weight of container and its geometry, the surface area and average thickness were calculated (ASTM-2684). The permeability values were calculated and the results are summarized below. In addition, tensile specimen were cut from the sidewalls and their tensile strength was determined (ASTM D638, type 4, 50 mm/min). Results are summarized below:

| WT. % Nylon | WT. % Compatibilizer | Xylene Permeability (gm.mm/day.sq.meter) | Tensile Strength, (MPA) | Elongation (%) |
|---|---|---|---|---|
| 3.2 | 3.8 | 0.94 | 22.3 | 528 |

Example 1

For this example nylon and compatibilizer were coextruded prior to mixing with polyethylene pellets. Nylon was used as the core and compatibilizer as the sheath. The coated pellets were made by the following procedure:

Dried pellets of the nylon (core polymer) were fed into an extruder maintained at approximately 300° C. The melted polymer was then passed through a metering pump to the spin head. Similarly, and at the same time, the compatibilizer (sheath polymer) was fed into another extruder with heating zones maintained at 180° to 190° C. and passed through a metering pump to the spin head. The two melt streams were combined in the spin head to produce a coextruded strand. The sheath and core metering pumps were adjusted to vary the sheath-to-core ratio at 56.5 wt. % core. The strand was passed to a pull roll which was used to adjust strand diameter. After the pull roll, the strand passed through a water stripper to remove surface water then to a cutter. The extruded strand was cut into pellets which were used for making bottles. Because the compatibilizer and nylon were coextruded there was no variaion in the composition as found in the comparative example 1. The nylon and the compatibilizer were the same as used in comparative example 1.

For this example, coextruded pellets had a sheath/core ratio of 43.5 wt. % (compatibilizer)/56.5 wt. % (barrier resin). 5.7 parts of this product was mixed with 94.3 parts of the high density polyethylene of comparative example 1 in a polyethylene bag and were used to make bottles. Equipment and processing conditions were the same as used in comparative example 1. The barrier effectiveness and tensile strength were determined as in comparative example 1. Results are summarized below:

| WT. % Nylon | WT. % Compatibilizer | Xylene Permeability (gm.mm/day.sq.meter) | Tensile Strength, (MPA) | Elongation (%) |
|---|---|---|---|---|
| 3.2 | 2.5 | 0.71 | 26.7 | 616 |

Thus, by using core/sheath pellets, significant improvement in the barrier and mechanical properties of the articles is obtained. In addition, the segregation of the components has been eliminated, enabling the articles to be more uniform and the favorable results more reproducible.

Example 2

For this example, the sheath/core ratio was varied. Coextruded pellets were produced by the same procedure and with the same materials as Example 1 except that the sheath and core metering pumps were adjusted to vary the sheath-to-core ratio at 63.6% core. Other parameters were the same as in Example 1.

For this example, coextruded pellets had a sheath/core ratio of 36.4 wt % (compatibilizer)/63.6 wt. % (barrier resin). 5.1 parts of this product was mixed with 94.9 parts of the high density polyethylene of comparative example 1 in a polyethylene bag and used for making bottles. Equipment and processing conditions were the same as used in comparative example 1. The barrier effectiveness and tensile strength were determined as comparative example 1. Results are summarized below:

| WT. % Nylon | WT. % Compatibilizer | Xylene Permeability (gm.mm/day.sq.meter) | Tensile Strength, (MPA) | Elongation (%) |
|---|---|---|---|---|
| 3.2 | 1.8 | 0.83 | 27.5 | 662 |

Thus, similar improvements were seen as in Example 1.

Comparative Example 3

For this example ethylene-vinyl alcohol copolymer (EVOH) containing 30 mole percent ethylene (melt index at 210° C.) was used as the barrier resin. The compatibilizer and the polyethylene were the same as used in comparative example 1.

A mixture of EVOH 3.2 wt %, compatibilizer 3 wt % and polyethylene 93.8 wt % were used to make laminar bottles as comparative example 1 at an extrusion temperature of approximately 205° C. Barrier effectiveness and tensile properties were determined as comparative example 1. Results are summarized below:

| WT. % EVOH | WT. % Compatibilizer | Xylene Permeability (gm.mm/day.sq.meter) | Tensile Strength, (MPA) | Elongation (%) |
|---|---|---|---|---|
| 3.2 | 3.0 | 17.7 | 14.8 | 482 |

Example 3

For this example ethylene-vinyl alcohol copolymer (EVOH) and the compatibilizer were coextruded prior to mixing with polyethylene pellets. The EVOH, compatibilizer and polyethylene were the same as used in comparative example 3. EVOH was used as the core and compatibilizer as the sheath of the pellet The pellets were made as example 1 with core extruder maintained at approximately 180° C.

For this example, coextruded pellets had a sheath/core ratio of 48 wt % (compatibilizer)/52 wt % (barrier resin). Prior to making bottles, 6.2 parts of this product were mixed with 93.8 parts of polyethylene in a polyethylene bag. Equipment and processing conditions were the same as used in comparative example 3. The barrier effectiveness and tensile properties were determined as in comparative example 3. Results are summarized below:

| WT. % EVOH | WT. % Compatibilizer | Xylene Permeability (gm.mm/day.sq.meter) | Tensile Strength, (MPA) | Elongation (%) |
|---|---|---|---|---|
| 3.2 | 3.0 | 13.0 | 18.2 | 546 |

Thus, by using core/sheath pellets, improved barrier and mechanical properties are obtained over salt and pepper blend of compatibilizer and barrier resins.

What is claimed is:

1. A process for making a laminar, shaped article having improved fluid barrier and mechanical properties, that article comprising (i) polyolefin from the group consisting of polyethylenes, polypropylenes, polybutylenes, copolymers thereof, and mixtures thereof, said polyolefin being in the form of a continuous, matrix phase; and (ii) a barrier polymer, incompatible with polyolefin (i), in the form of a discontinuous distribution of thin, substantially two-dimensional, parallel and overlapping layers within said polyolefin matrix; said process comprising the steps of:

(a) producing coextruded heterogeneous pellets by melting in a first extruder a barrier polymer; and melting in a second extruder a compatibilizer (iii) for said polyolefin (i) and said barrier polymer (ii), said compatibilizer being an alkyl-carbonyl substituted polyolefin, thereby producing two melt streams; combining said melt streams in a spin head to produce a coextruded strand having said compatibilizer (iii) as a sheath layer and said barrier polymer (ii) as a core; and cutting said strand into pellets;

(b) heterogeneously blending particles of a polyolefin (i) and said pellets (a); and heating the resultant blend to a temperature above the melting point of the highest melting component to form a heterogeneous melt;

(c) stretching the resultant heterogeneous melt 100–500 percent in at least one direction to form a stretched body; and (d) cooling the resultant stretched body to a temperature below the melting point of the lowest melting component.

2. The process of claim 1 wherein the barrier polymer (ii) is polyamide.

* * * * *